(12) United States Patent
Van Rotterdam et al.

(10) Patent No.: US 12,450,078 B2
(45) Date of Patent: Oct. 21, 2025

(54) MIGRATION OF A DESKTOP WORKLOAD

(71) Applicant: CITRIX SYSTEMS, INC., Fort Lauderdale, FL (US)

(72) Inventors: Jeroen Mattijs Van Rotterdam, Fort Lauderdale, FL (US); P.J. Hough, Santa Clara, CA (US)

( * ) Notice: Subject to any disclaimer, the term of this patent is extended or adjusted under 35 U.S.C. 154(b) by 351 days.

(21) Appl. No.: 16/794,372

(22) Filed: Feb. 19, 2020

(65) Prior Publication Data

US 2021/0255884 A1  Aug. 19, 2021

(51) Int. Cl.
*G06F 9/455* (2018.01)
*G06F 9/50* (2006.01)
*G06Q 10/1093* (2023.01)

(52) U.S. Cl.
CPC ........ *G06F 9/45558* (2013.01); *G06F 9/5083* (2013.01); *G06Q 10/1097* (2013.01); *G06F 2009/4557* (2013.01)

(58) Field of Classification Search
CPC .............. G06F 9/45558; G06F 9/5083; G06F 2009/4557; G06Q 10/1097
See application file for complete search history.

(56) References Cited

U.S. PATENT DOCUMENTS

| | | | |
|---|---|---|---|
| 8,341,626 B1 * | 12/2012 | Gardner | G06F 9/4856 718/1 |
| 10,540,388 B1 * | 1/2020 | Alexander | H04L 67/306 |
| 10,594,562 B1 * | 3/2020 | Rastogi | H04L 41/0896 |
| 11,023,282 B2 * | 6/2021 | Shim | G06F 9/5077 |
| 2011/0131330 A1 * | 6/2011 | Beaty | G06F 9/5077 718/1 |
| 2012/0023223 A1 * | 1/2012 | Branch | G06F 9/4856 709/224 |
| 2013/0073670 A1 | 3/2013 | Das et al. | |
| 2013/0219043 A1 | 8/2013 | Steiner et al. | |
| 2017/0147399 A1 * | 5/2017 | Cropper | G06F 9/45533 |
| 2017/0364387 A1 * | 12/2017 | Ahmed | G06F 3/067 |
| 2019/0158606 A1 * | 5/2019 | Guim Bernat | H04W 4/40 |
| 2020/0034169 A1 * | 1/2020 | Deore | G06F 9/45558 |
| 2020/0394063 A1 * | 12/2020 | Kelly | G06F 9/452 |
| 2021/0026661 A1 * | 1/2021 | Sulcer | H04L 41/0806 |

(Continued)

FOREIGN PATENT DOCUMENTS

| | | |
|---|---|---|
| JP | 2006091954 | 4/2006 |
| JP | 2013210816 | 10/2013 |

(Continued)

*Primary Examiner* — Wynuel S Aquino

(57) ABSTRACT

A computer system includes a client device, geographically distributed data centers and a server. The client device remotely accesses a virtual desktop, with the virtual desktop configured to run and store a workload for an end-user of the client device. One of the data centers is assigned to host a virtual desktop for the client device based on a current location of the end-user. The server determines an indication of a future change in location of the end-user from the current location to a target location that is different from the current location. The server further determines which data center is to be reassigned to host the virtual desktop in response to the determined indication, and cooperates with the data centers to migrate the workload to the reassigned data center in response to travel of the end-user to the target location.

20 Claims, 12 Drawing Sheets

(56) References Cited

U.S. PATENT DOCUMENTS

2021/0103481 A1* 4/2021 Bernat .................. G06F 9/5072
2021/0208946 A1* 7/2021 Watfa .................... G06F 9/5044

FOREIGN PATENT DOCUMENTS

| JP | 2013246532 | 12/2013 |
| JP | 2014186408 | 10/2014 |
| JP | 2017041015 | 2/2017 |
| JP | 2017525177 | 8/2017 |
| JP | 2017528839 | 9/2017 |
| WO | WO2013039930 | 3/2013 |
| WO | WO2019213556 | 11/2019 |

* cited by examiner

MIGRATION OF A DESKTOP WORKLOAD

TECHNICAL FIELD

The present disclosure relates to desktop virtualization, and more particularly, to migrating a virtual desktop between data centers.

BACKGROUND

There are several different types of desktop virtualization systems. As an example, virtual desktop infrastructure (VDI) refers to the process of running a user desktop in a virtual machine that resides on a server. The virtual desktop runs and stores a desktop workload that includes an operating system, applications and data. The desktop workload may also be referred to as a workload.

Servers in such systems include storage for the desktop workloads, as well as software components to provide the virtual desktops and allow users to interconnect to them. For example, a VDI server may include one or more hypervisors to create and maintain multiple virtual machines, software to manage the hypervisors, a connection broker, and software to provision and manage the virtual desktops.

In desktop virtualization systems, client devices access the virtual desktops via a communications network. There are several cloud service providers that organizations and enterprises may turn to in order to provide desktop virtualization systems for their users. Example cloud service providers include Microsoft Azure and Amazon Web Services. With the increased use of communications networks in general, traffic on these networks is becoming more constrained and congested. This constraint and congestion may negatively impact performance when client devices access virtual desktops.

SUMMARY

A computer system includes a client device, a plurality of geographically distributed data centers and a server. The client device remotely accesses a virtual desktop, with the virtual desktop configured to run and store a workload for an end-user of the client device. The data centers provide virtual desktops, with one of the data centers being assigned to host the virtual desktop for the client device based on a current location of the end-user. The server determines an indication of a change in location of the end-user, with the change in location to occur at a time in the future. The change is from the current location to a target location that is different from the current location. The server further determines which data center is to be reassigned to host the virtual desktop in response to the determined indication, and cooperates with the data centers to migrate the workload to the reassigned data center in response to travel of the end-user to the target location.

The server may determine the reassigned data center based on determining respective geographic distances between the target location and the data centers, and select the data center having a shortest geographic distance.

The server may determine the reassigned data center based on determining respective latencies between the target location and the data centers, and select the data center having a lowest latency.

The server may determine the reassigned data center based on determining respective bandwidths between the target location and the data centers, and select the data center having a highest bandwidth.

The server may determine the reassigned data center based on determining respective costs in moving the workload to the data centers, and select the data center having a lowest cost.

The workload may be migrated to the reassigned data center prior to the end-user arriving at the target location. The server may further determine when the client device is accessing the virtual desktop, with the workload to be migrated to the reassigned data center when the virtual desktop is not being accessed by the client device.

The workload may include a calendar for the end-user of the client device, and wherein the server determines the indication of the future change in location of the end-user based on the end-user's calendar.

The computer system may further comprise an exchange server to provide the end-user's calendar to the server. The end-user's calendar may include upcoming scheduling information on the end-user, and wherein the server may further analyze the upcoming scheduling information to determine the indication of the future change in location of the end-user to the target location.

The workload may include an operating system, at least one application and data.

Another aspect is directed to a server comprising a memory and a processor to cooperate with the memory to assign a data center to host a virtual desktop for a client device based on a current location of the end-user, with the virtual desktop configured to run and store a workload for an end-user of the client device. The processor determines an indication of a change in location of the end-user, with the change in location to occur at a time in the future. The change is from the current location to a target location that is different from the current location. The processor further determines which data center is to be reassigned to host the virtual desktop in response to the determined indication, and cooperates with the data centers to migrate the workload to the reassigned data center in response to travel of the end-user to the target location.

Yet another aspect is directed to a method comprising assigning a data center to host a virtual desktop for a client device based on a current location of the end-user, with the virtual desktop configured to run and store a workload for an end-user of the client device. An indication of a change in location of the end-user is determined, with the change in location to occur at a time in the future. The change is from the current location to a target location that is different from the current location. The method may further include determining which data center is to be reassigned to host the virtual desktop in response to the determined indication, and cooperating with the data centers to migrate the workload to the reassigned data center in response to travel of the end-user to the target location.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Traffic on cloud-based networks is becoming more constrained and congested due to an increased use by end-users. When bandwidth is insufficient and network data traffic exceeds capacity, this results in an increase in end-user latencies when client devices access virtual desktops. Increased end-users latencies reduce quality of service (QOS) experienced by the end-users.

To reduce the latency problems described above, end-users are initially assigned to a data center that is geographically close to where each end-user resides. A problem arises, however, when end-users travel to different geographical locations. Even when in a different geographical location, each end-user still accesses their desktop workload stored at the assigned data center.

The techniques and teachings of the present disclosure provide the ability to migrate an end-user's desktop workload across multiple data centers. The migration is based on determining an indication of a future change in location of the end-user from a current location to a target location, and determining which data center is to be reassigned to host the virtual desktop in response to the determined indication. The end-user's desktop workload is migrated to the reassigned data center in response to travel of the end-user to the target location.

Figure 1:
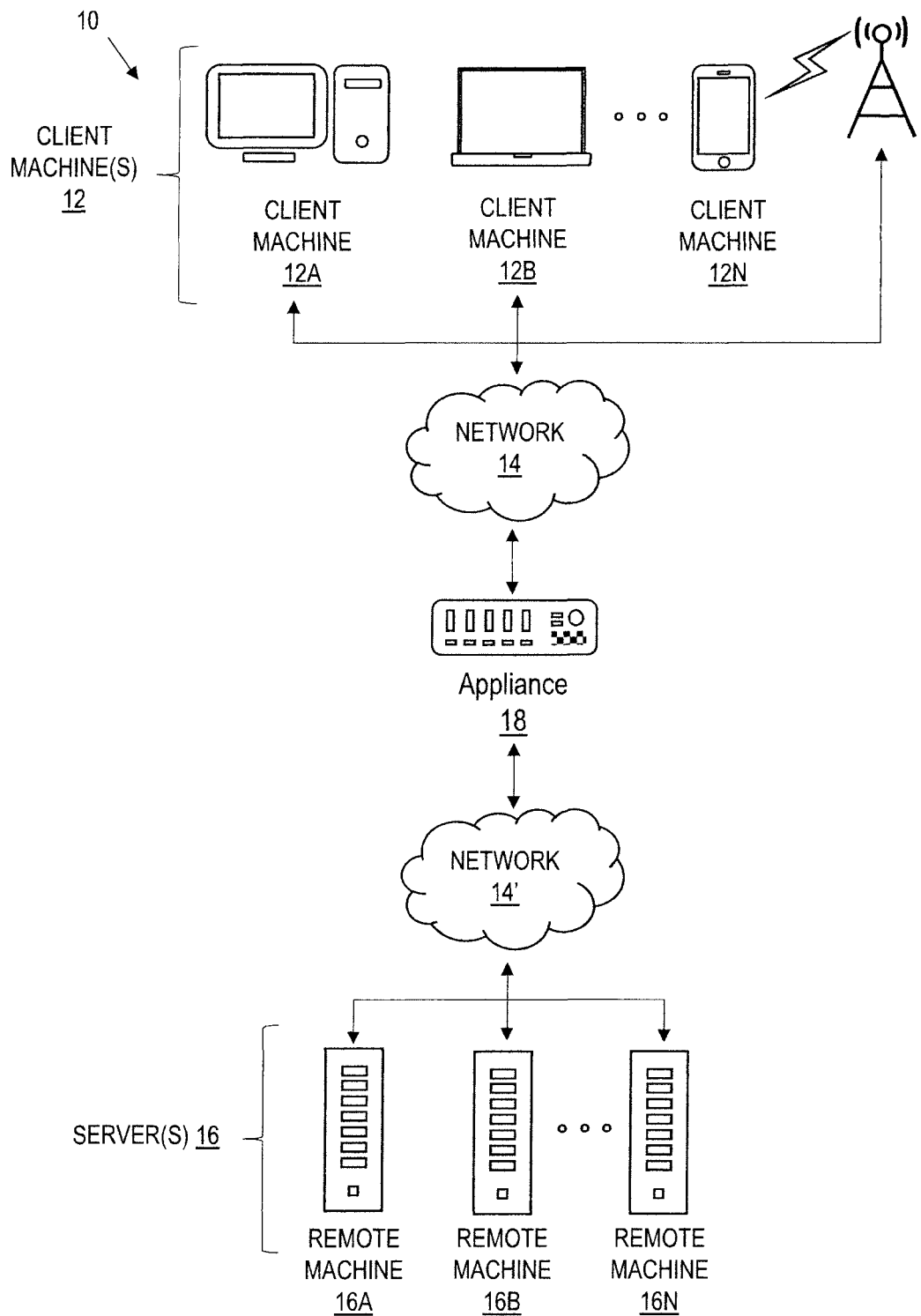
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'.

In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 108 may operate as an application delivery controller (ADC) to provide clients with access to business applications and other data deployed in a data center, the cloud, or delivered as Software as a Service (Saas) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VOIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
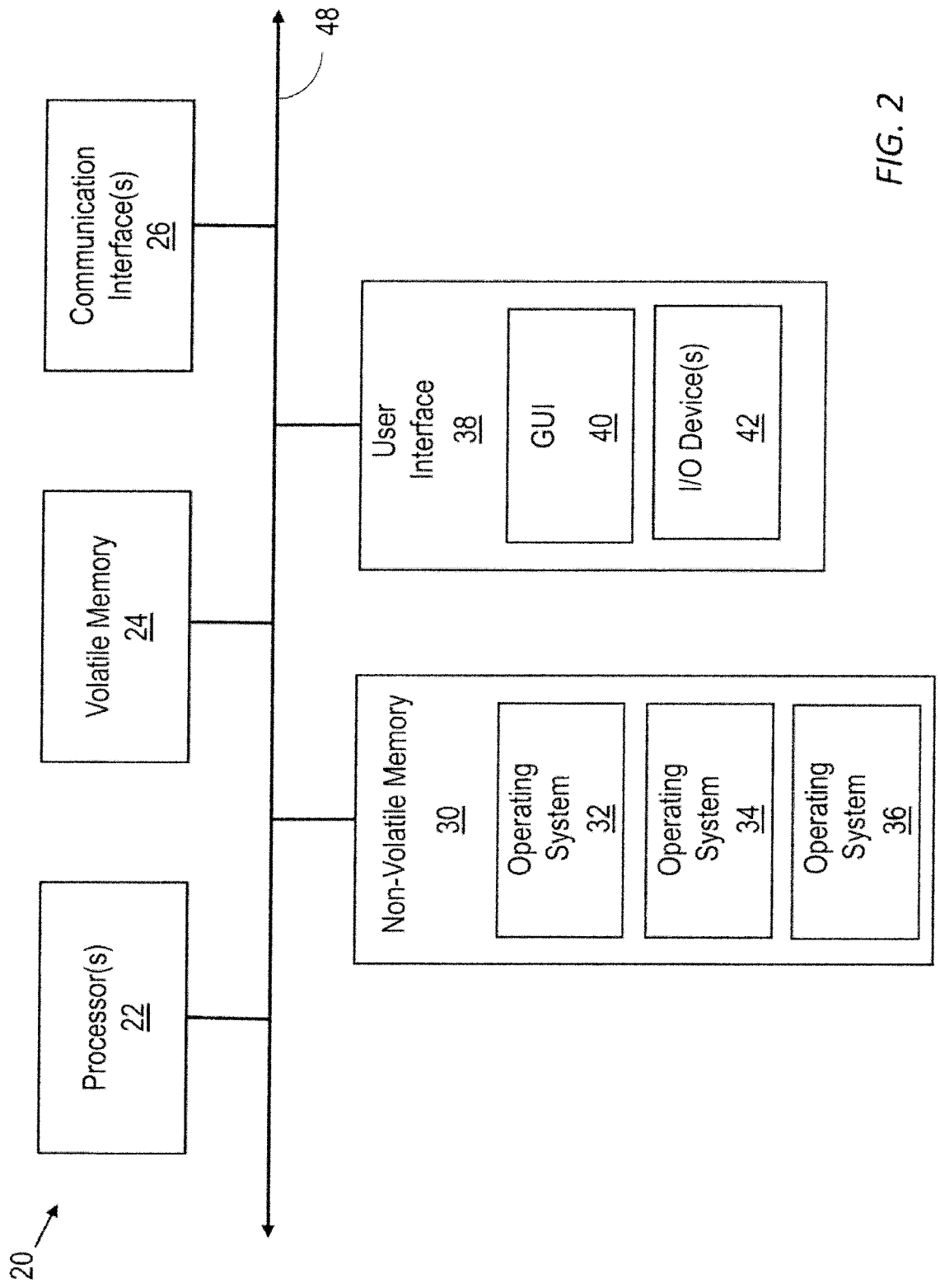
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
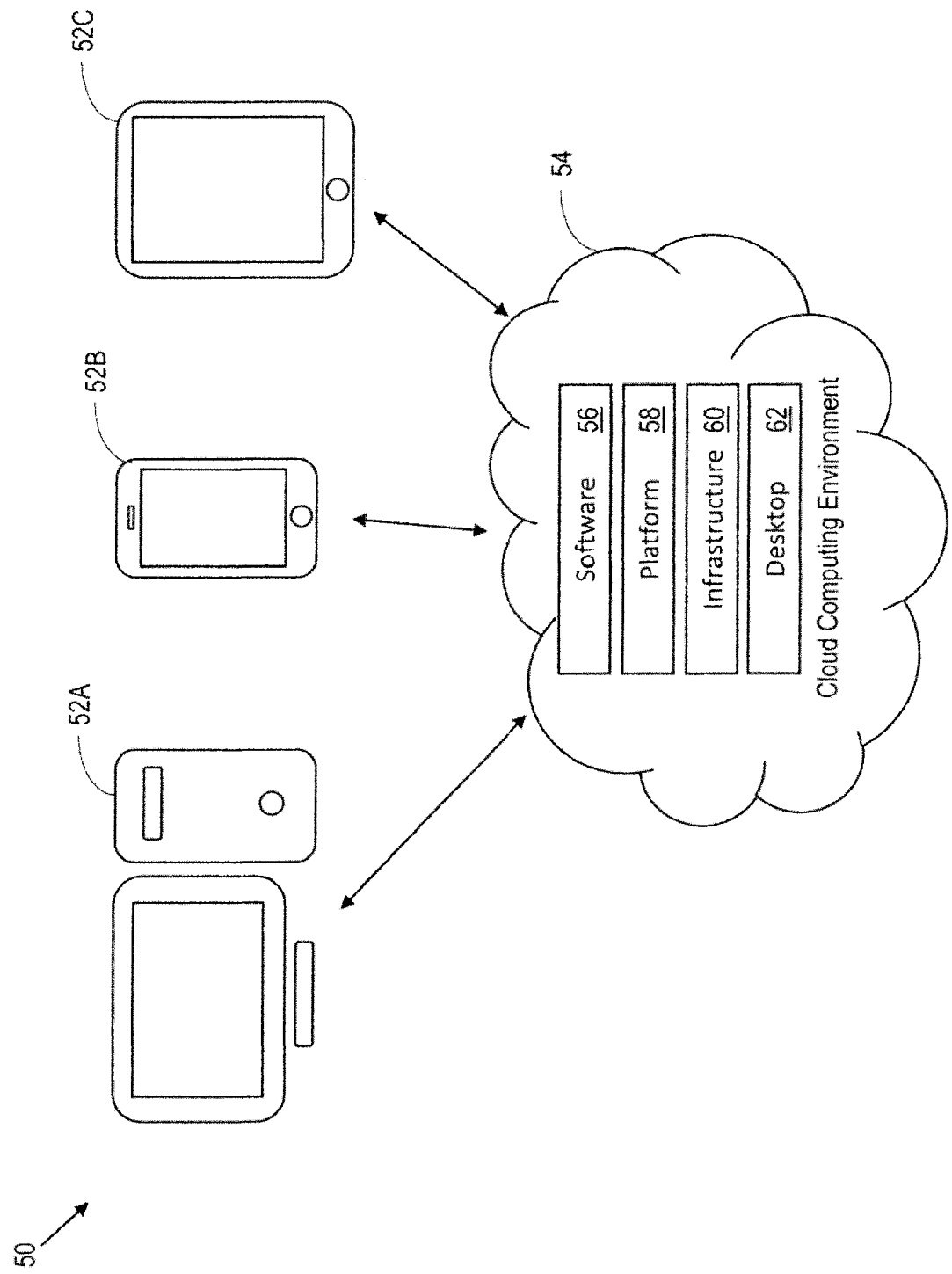
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment 50 may provide cloud-based delivery of different types of cloud computing services, such as Software as a service (Saas) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, Saas providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONEDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
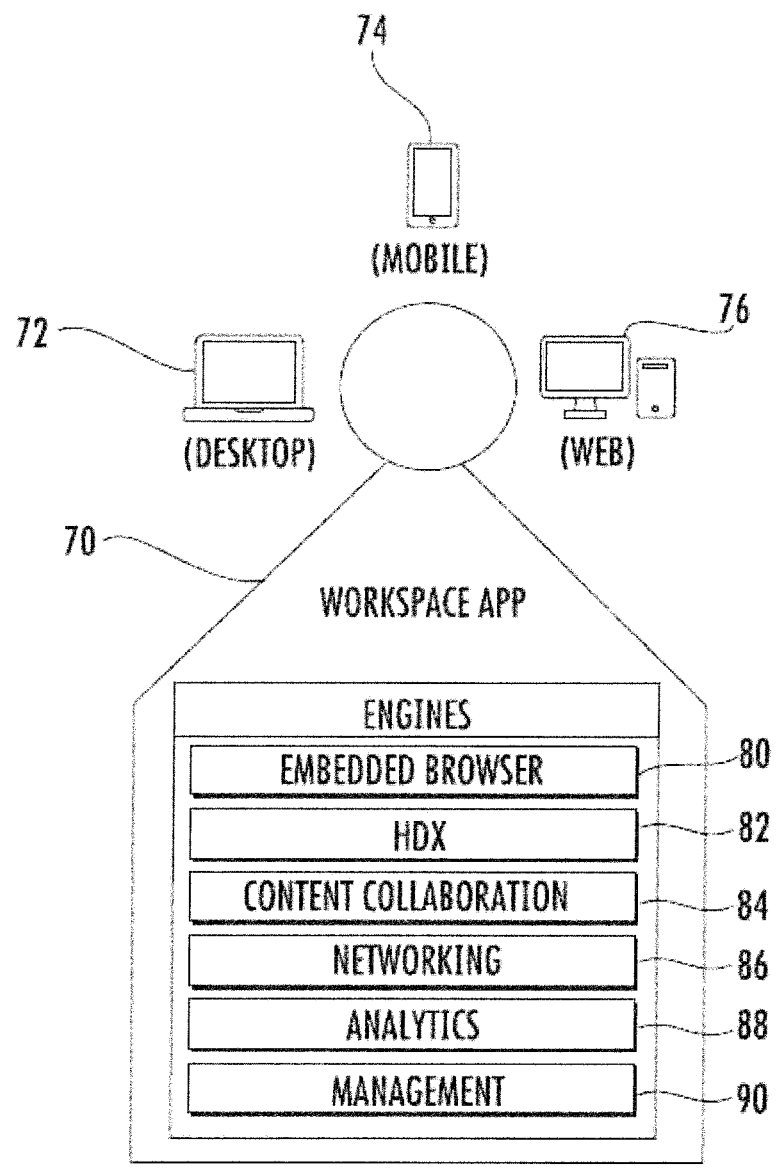
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app 70 may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific u-VPN connection. A u-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
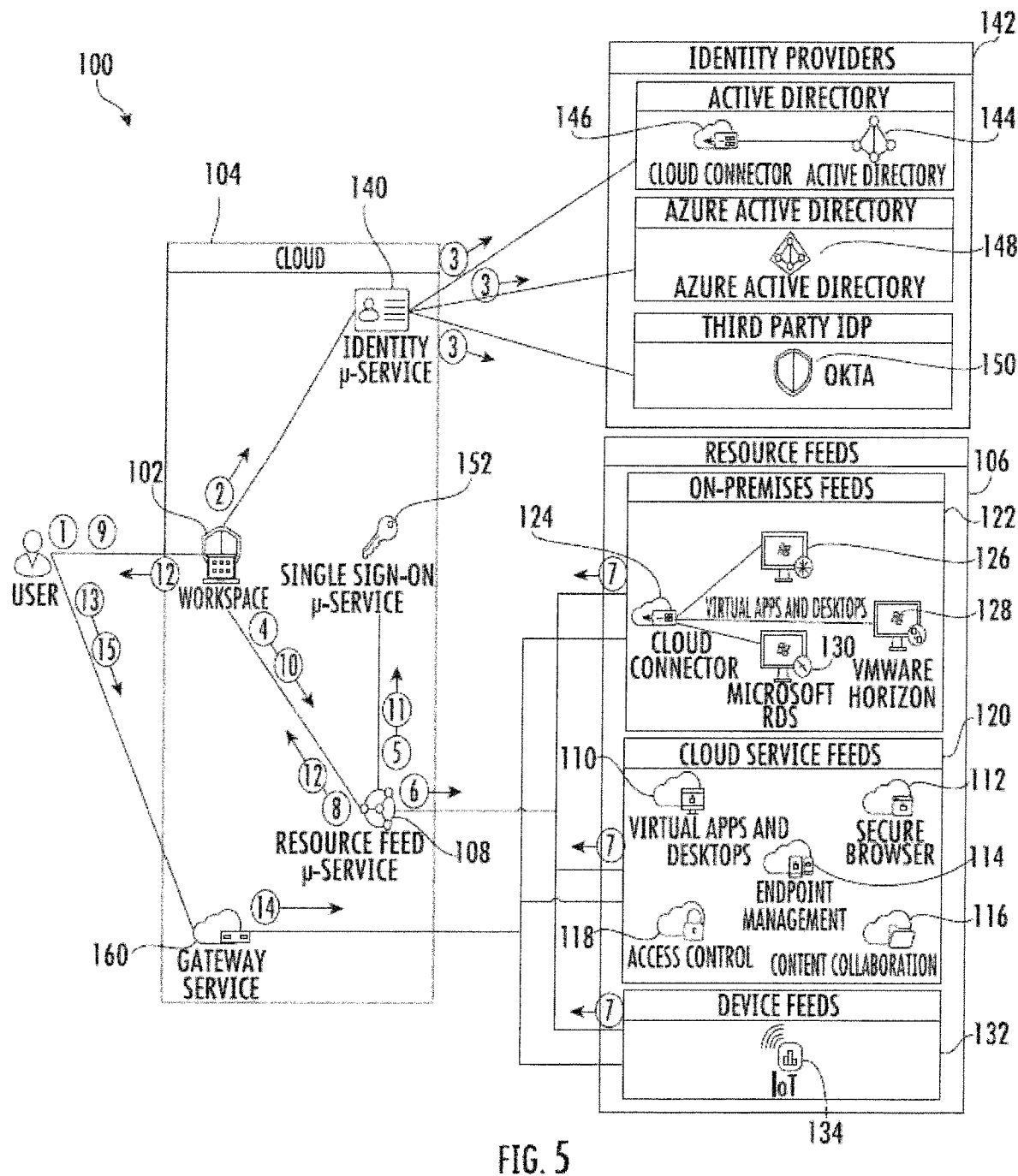
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds 16 via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment 20, a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event 15). Having an entire workspace delivered through a single access point or application advantageously improves productivity and streamlines common workflows for the user.

Figure 6:
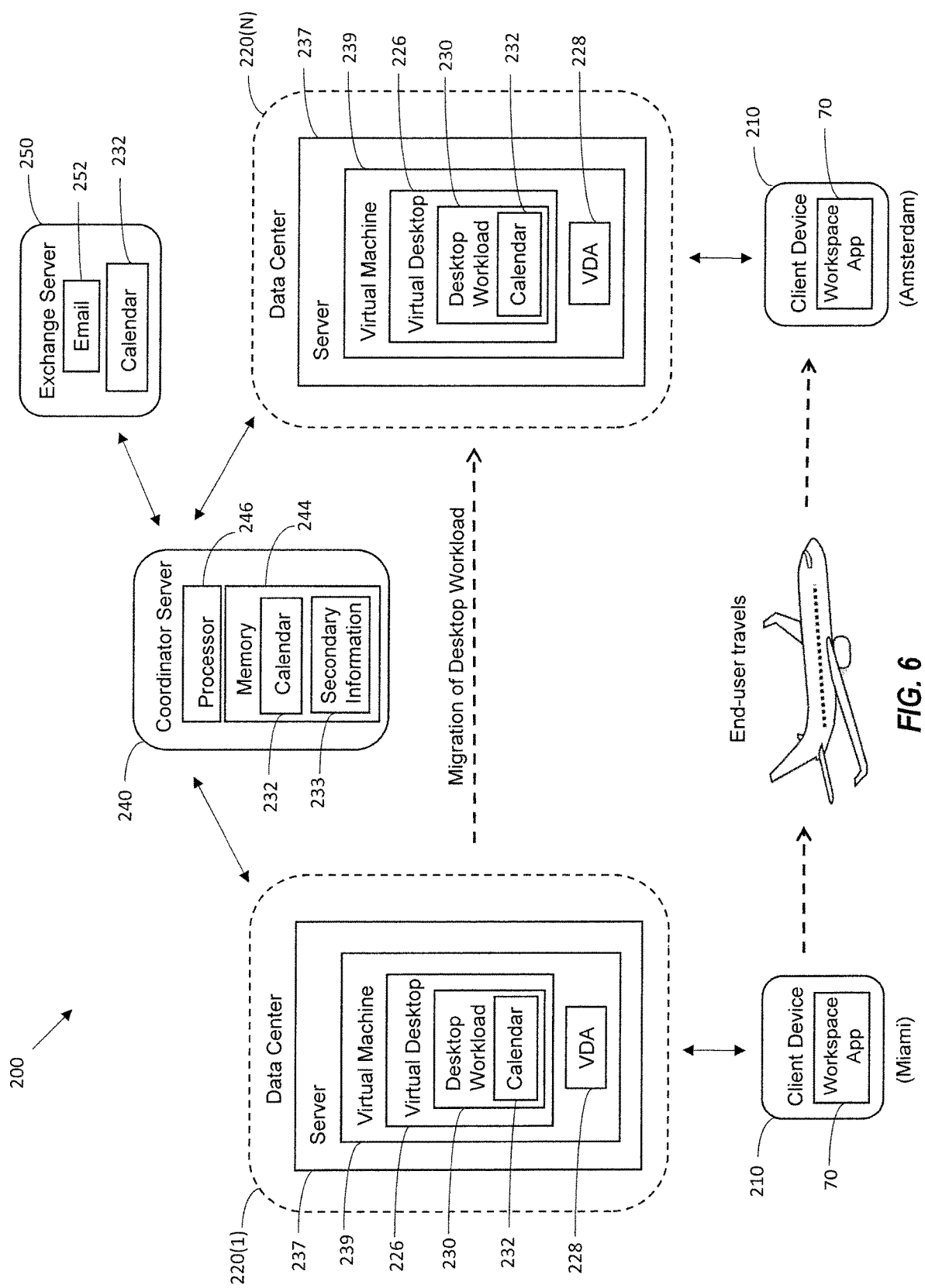
FIG. 6 is a schematic block diagram of a computer system illustrating migration of a desktop workload to a different data center, in which various aspects of the disclosure may be implemented.

Referring now to FIG. 6, a computer system 200 providing the ability to migrate an end-user's desktop workload 230 across multiple data centers 220(1)-220(N) based on an end-user's calendar 232 to improve end-user latency will be discussed. The computer system 200 illustratively includes a client device 210 configured to remotely access a virtual desktop 226. The virtual desktop 226 is configured to run and store a desktop workload 230 that includes a calendar 232 for an end-user of the client device 210. The desktop workload 230 may further include an operating system, applications and data. The desktop workload 230 may also be referred to as a workload.

A plurality of geographically distributed data centers 220(1)-220(N) provide a plurality of virtual desktops 226. The data centers 220(1)-220(N) are typically geographically distributed in the same country and/or in different countries around the world. One of the data centers 220(1) is assigned to host the virtual desktop 226 for the client device 210.

A coordinator server or server 240 is configured to determine or predict a geographical location of where the end-user will reside at a particular point in time based on the end-user's calendar 232. In other words, an indication of a future change in location of the end-user is determined by the coordinator server 240 based on the end-user's calendar 232. The end-user is currently at a first location and is assigned to a first data center 220(1), and is scheduled to move to a second location that is different from the first location.

The coordinator server 240 is also configured to cooperate with the plurality of data centers 220(1)-220(N) to migrate the desktop workload 230 to a different data center 220(N) that is geographically closer to where the end-user will reside at the particular point in time based on the end-user's calendar 232. The different data center 220(N) is now assigned to host the virtual desktop 226 for the client device 210.

Migration refers to the desktop workload 230 being moved from the first data center 220(1) at the first location of the end-user to a second data center 220(N) that is proximate to the second location of the end-user. Migration of the desktop workload 230 enables access to the virtual desktop 226 from the second data center 220(N) with a lower latency as compared to a virtual desktop 226 hosted by the first data center 220(1) and accessed from the second location of the end-user. Migration of the desktop workload 230 to the second data center 220(N) advantageously improves end-user latency.

While only one client device 210 and two data centers 220(1)-220(N) are shown in the illustrated example, it will be appreciated that any number of such client devices and data centers may be used in different embodiments. The data centers 220(1)-220(N) may be generally referred to as data centers 220.

The client device 210 may be a smartphone, a tablet computer, a laptop computer, a desktop computer, for example. The data centers 220(1)-220(N) may be provided by Microsoft Azure or Amazon Web Services, for example.

An example architecture for desktop virtualization is provided by Citrix Virtual Apps and Desktops (CVAD), from Citrix Systems, Inc. CVAD is an application virtualization platform that helps optimize productivity with universal access to virtual apps and server-based desktops from different client devices 210. CVAD carries all the same functionality as Citrix Virtual Apps, plus the option to implement a scalable Virtual Desktop Infrastructure (VDI). Citrix Virtual Apps/CVAD are available as a cloud service or an on-prem configuration. Other suitable platforms for providing virtual desktops and virtual apps may be used in different embodiments.

Virtual desktop infrastructure (VDI) supports running virtual desktops 226 in virtual machines 239 that are hosted on servers 237 in the data centers 220. Each virtual desktop 226 runs and stores a desktop workload 230 that remains associated with a respective end-user. In addition to including the end-user's calendar, the desktop workload 230 further includes an operating system, applications and data.

The coordinator server 240 determines which virtual machine 239 is to host the virtual desktop 226 that will be accessed by the client device 210. Each virtual machine 239 has a virtual delivery agent 228 associated therewith. The client device 210 will have a virtual machine 239 and a corresponding virtual delivery agent 228 assigned by the coordinator server 240.

A virtual delivery agent 228 is software installed on a virtual machine 239 running in the server 237. The virtual machine 239 provides the virtual desktop 226, and the virtual delivery agent 228 makes the virtual desktop 226 remotely available to the client device 210. The virtual delivery agent 228 may be a Citrix Virtual Delivery Agent (VDA), for example.

In the illustrated example, the client device 210 is initially assigned to a virtual machine 239 in data center 220(1) since the end-user currently resides in Miami. This helps to reduce latency between the end-user's client device 210 and the server 237 where the virtual desktop 226 is running. Each time the end-user accesses a virtual desktop 226, the end-user is directed to the assigned data center 220(1). The desktop workload 230 from the last time the end-user accessed a virtual desktop 226 is provided by the virtual machine 239 running the desktop workload 230.

However, end-user latency is increased when the end-user travels to a different geographical location. Even when in a different geographical location, the end-user still accesses the desktop workload 230 that is stored at the assigned data center 220(1). This increase in distance between the end-user and the data center 220 causes the increased end-user latency.

The end-user of client device 210 is in Miami and is assigned to data center 220(1) that is geographically close to Miami. The end-user then travels from Miami to Amsterdam. When in Amsterdam, the end-user still accesses their desktop workload 230 stored at the data center 220(1) close to Miami. This increases the latency between the end-user's client device 210 (located in Amsterdam) and the server 237 (located near Miami) where the virtual desktop 226 is running. The increased latency negatively impacts performance since longer than normal delays are introduced before the end-user views files and data via the virtual desktop 226.

The above problem of increased latency is addressed by the coordinator server 240. The coordinator server 240 functions as a connection broker or delivery controller for the client device 210 by assigning the client device 210 to a virtual machine 239 in a particular data center 220 based on predicted movement of the end-user as determined from the end-user's calendar 232. The calendar 232 provides upcoming scheduling and meeting information for the end-user.

The coordinator server 240 interfaces with an exchange server 250 to access the end-user's calendar 232 for analyzing. An example exchange server 250 is Microsoft Exchange Server developed by Microsoft. The Microsoft Exchange Server is an email and calendaring server for end-users. From the perspective of the client device 210, the desktop workload 230 includes software that retrieves the end-user's emails 252 and calendar 232 from the exchange server 250. Since the exchange server 250 is a Microsoft Exchange Server, the desktop workload 230 includes Microsoft Outlook to interface with the Microsoft Exchange Server. Other suitable platforms functioning as an exchange server may be used in different embodiments.

By analyzing the upcoming scheduling and meeting information contained within the end-user's calendar 232, the coordinator server 240 can determine a geographical location on where the end-user will reside at a particular point in time. The coordinator server 240 includes at least one processor 246 and at least one memory 244 cooperating therewith. The at least one memory 244 receives the calendar 232 from the exchange server 250, and the at least one processor 246 analyzes entries in the calendar 232.

In the illustrated example, the calendar 232 includes an entry that the end-user has four scheduled 9:00 am meetings in Amsterdam starting August 13 through August 16. By analyzing these entries, the at least one processor 246 determines that the end-user will be in Amsterdam on August 13 through August 16. The coordinator server 240 then determines that the end-user will now be closer to data center 220(N) starting August 13.

After the coordinator server 240 determines that the end-user will be residing in Amsterdam starting August 13, the coordinator server 240 is further configured to analyze the upcoming scheduling information to determine when to migrate the desktop workload 230 to the different data center 220(N). Migration of the desktop workload 230 to data center 220(N) should occur prior to the end-user arriving in Amsterdam but not while the client device 210 is accessing a virtual desktop 230 via data center 220(1).

The coordinator server 240 determines from the upcoming scheduling and meeting information that the end-user has a scheduled flight departing Miami at 10:00 am on August 12. Consequently, the coordinator server 240 migrates the desktop workload 230 from data center 220(1) to data center 220(N) while the end-user is traveling to Amsterdam on August 12. Depending on the size of the desktop workload 230, migration may require 20 to 30 minutes. Data center 220(N) receiving the migrated desktop workload 230 is now assigned to host the virtual desktop 226 for the client device 210 while the end-user is residing in Amsterdam.

On the end-user's return to Miami, the coordinator server 240 determines from the upcoming scheduling and meeting information that the end-user has a scheduled flight departing Amsterdam at 11:00 am on August 17. Consequently, the coordinator server 240 migrates the desktop workload 230 from data center 220(N) back to data center 220(1) while the end-user is traveling to Miami on August 17.

In addition to using upcoming scheduling and meeting information in the end-user's calendar 232, secondary or supplemental information 233 may be also be used by the coordinator server 240. This secondary information 233 may be provided via the workspace app 70 running in the client device 210, and received by the memory 244 of the coordinator server 240. The workspace app 70 is as described above in reference to FIGS. 4 and 5, and allows an end-user to access workspace resources in the cloud 104, one category of which is applications. These applications can be SaaS apps, web apps or virtual apps.

As an example of secondary information 233, the end-user may use an on-line travel booking application to make flight and hotel reservations. The on-line travel booking application may be provided by SAP Concur, for example. The coordinator server 240 receives the flight and hotel reservations made for the end-user, and analyzes the dates, times and locations in the reservations. The flight and hotel reservations may be available to the coordinator server 240 by way of the virtual desktop 226.

In an alternative embodiment, the coordinator server 240 does not interface with the exchange server 250 to access the end-user's calendar 232. Instead, the coordinator server 240 uses the secondary information 233 provided via the workspace app 70 to make the determination on when and where to re-assign the end-user to a different data center 220 based on prediction of the end-user moving to a different location.

In another alternative embodiment, instead of migration of the desktop workload 230 from one data center 220(1) to a different data center 220(N), duplicate copies of the desktop workload 230 are stored at the other data centers 220. When the coordinator server 240 determines that the end-user is moving to a different location, the coordinator server 240 then re-assigns the end-user to access the duplicate copy of the desktop workload 230 at the different data center 220(N).

Figure 7:
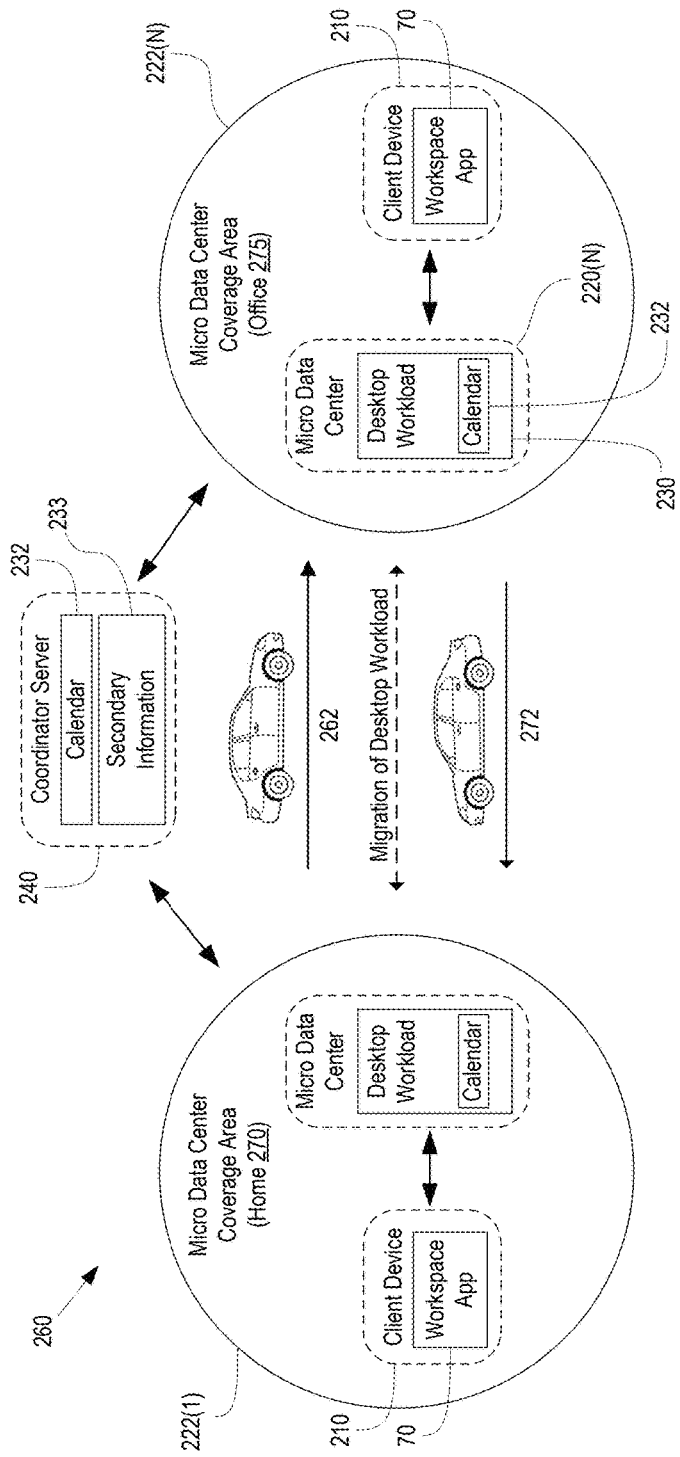
FIG. 7 is a simplified schematic block diagram illustrating migration of a desktop workload between data centers based on travel of an end-user between home and the office.
Figure 8:
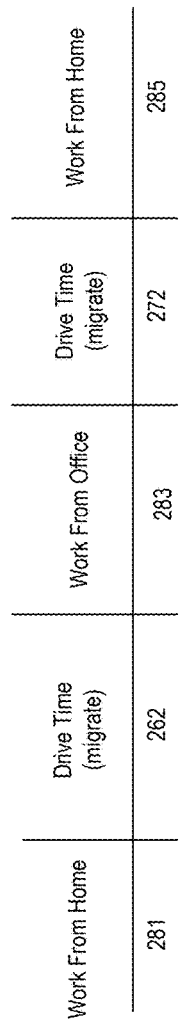
FIG. 8 is a time line on travel of the end-user and migration of the desktop workload as shown in FIG. 7.

Referring now to FIGS. 7 and 8, the illustrated computing system 260 may be configured such that the data centers are point of presence (POP) micro data centers 220(1)-220(N). The micro data centers 220(1)-220(N) are at the edge of the cloud-based network where desktop workloads 230 can run. Dynamically transporting desktop workloads 230 among the micro data centers 220(1)-220(N) advantageously improves Desktop as a Service (DaaS) sessions by reducing end-user latencies when virtual desktops 226 are accessed.

In the illustrated example, the calendar 232 includes information on the end-user's work schedule. The coordinator server 240 analyzes this information to determine when the end-user is scheduled to be at home 270 and when the end-user is scheduled to be at the office 275. For example, the end-user is scheduled to work from 9:00 am to 6:00 pm Monday through Friday.

A time line 280 lays out a sequence of events on travel of the end-user between the end-user's home 270 and office 275, and migration of the desktop workload 230. The end-user may work from home 270 when not at the office 275. This corresponds to reference 281, in which case the desktop workload 230 is at micro data center 220(1).

The end-user is to start work at the office 275 at 9:00 am each Monday through Friday. The end-user has about a 30 minute drive time from home 270 to the office 275, which corresponds to reference 262. The coordinator server 240 migrates the desktop workload 230 from micro data center 220(1) to micro data center 220(N) during the end-user's drive time to the office 275. Prior to migrating the desktop workload 230, the coordinator server 240 checks to see that the end-user is not active on the virtual desktop 226.

As discussed above in reference to FIG. 6, secondary information 233 may be used to determine that the end-user is not active on the virtual desktop 226. Not active means that the client device 210 is not accessing the virtual desktop 226, and if the virtual desktop 226 is being accessed, then the end-user is not using a keyboard or input device of the client device 210 during the virtual desktop session.

This secondary information 233 may be provided via the workspace app 70 running in the client device 210. An application accessed by the end-user via the workspace app 70 may be used to track GPS movement of the end-user. For example, a map application, such as Google maps, tracks location of the end-user. The coordinator server 240 is configured to receive this GPS information to determine when to migrate the desktop workload 230.

The end-user works at the office from 9:00 am to 6:00 pm, which corresponds to reference 283. The end-user has about a 30 minute drive time from the office 275 to home 270, which corresponds to reference 272. The coordinator server 240 migrates the desktop workload 230 from micro data center 220(N) to micro data center 220(1) during the end-user's drive time to home 270. As above, the coordinator server 240 checks to see that the end-user is not active on the virtual desktop 226 prior to migrating the desktop workload 230. The end-user is now able to work from home, which corresponds to reference 285.

Figure 9:
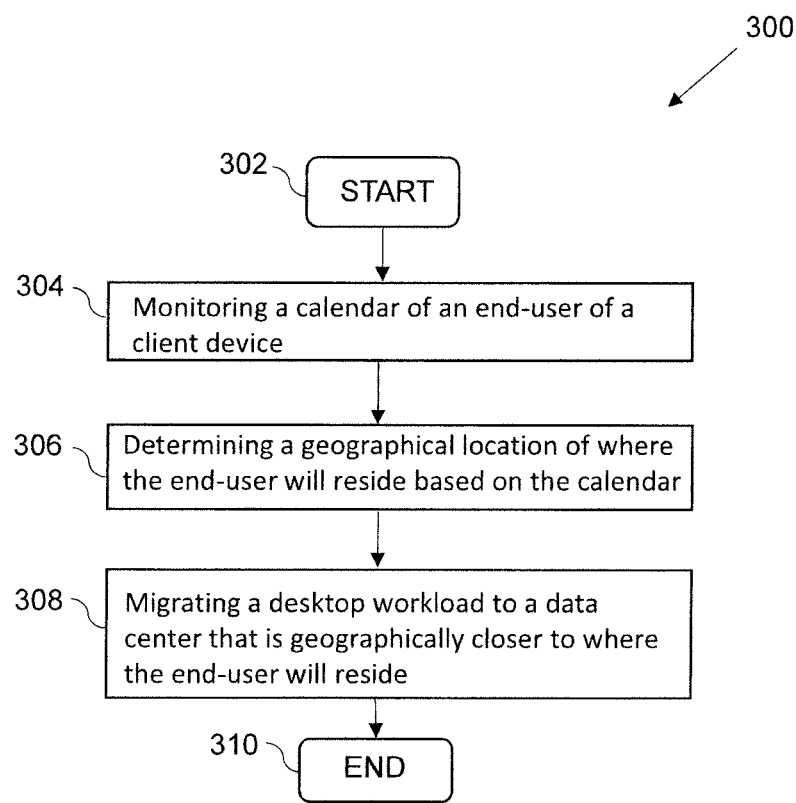
FIG. 9 is a flowchart illustrating a method for operating the coordinator server illustrated in FIG. 6.

Referring now to FIG. 9, a general flowchart 300 illustrating a method for operating the coordinator server 240 will be discussed. From the start (Block 302), the method includes monitoring a calendar 232 of an end-user of a client device 210 at Block 304. A geographical location of where the end-user will reside based on the calendar 232 is determined at Block 306. This is based on the coordinator server 240 analyzing upcoming scheduling and meeting information contained within the end-user's calendar 232. A desktop workload 230 is migrated to a data center 220(N) that is geographically closer to where the end-user will reside based on the end-user's calendar 232 at Block 308. The method ends at Block 310.

Figure 10:
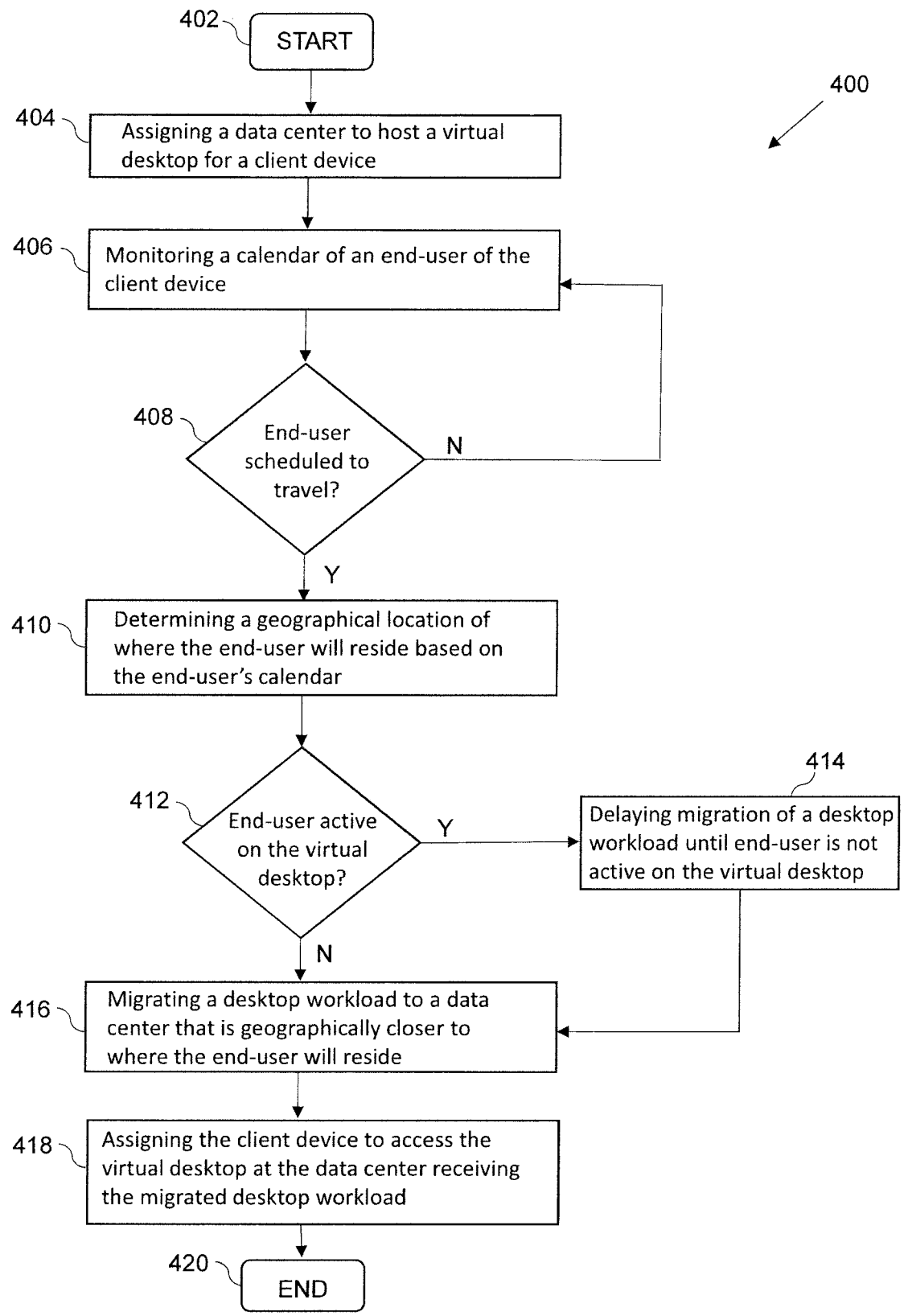
FIG. 10 is a more detailed flowchart illustrating a method for operating the coordinator server illustrated in FIG. 6.

Referring now to FIG. 10, a more detailed flowchart 400 illustrating a method for operating the coordinator server 240 will be discussed. From the start (Block 402), the method includes assigning a data center 220(1) to host a virtual desktop 226 for a client device 210 at Block 404. A calendar 232 of an end-user of the client device 210 is monitored at Block 406. A determination is made at Block 408 on if the end-user is scheduled to travel.

If the end-user is not scheduled to travel, then the method loops back to Block 406 to again monitor the calendar 232. If the end-user is scheduled to travel, then a geographical location of where the end-user will reside based on the calendar 232 is determined at Block 410. This is based on the coordinator server 240 analyzing upcoming scheduling and meeting information contained within the end-user's calendar 232.

A determination is made at Block 412 on if the end-user is active on the virtual desktop 226. The determination may be made using secondary information 233 as discussed above. If the end-user is active on the virtual desktop 226, then migration of a desktop workload 230 is delayed at Block 414 until the end-user is not active on the virtual desktop 226. If the end-user is not active on the virtual desktop 226, then the desktop workload 230 is migrated at Block 416 to a data center 220(N) that is geographically closer to where the end-user will reside based on the end-user's calendar 232. The client device 210 is assigned to access the virtual desktop 226 at the data center 220(N) receiving the migrated desktop workload 230 at Block 418. The method ends at Block 420.

As described above, movement of the workload 230 is in the context of geographic affinity of the data centers 220(1)-220(N) based on estimated travel defined in the end-user's calendar 232. However, a data center 220 that is geographically closer to the end-user may not always provide the best user experience since latency and bandwidth are the primary drivers. A data center 220 reassigned to receive the workload 230 could be worse in terms of latency and bandwidth even though it is geographically closer to the end-user.

Figure 11:
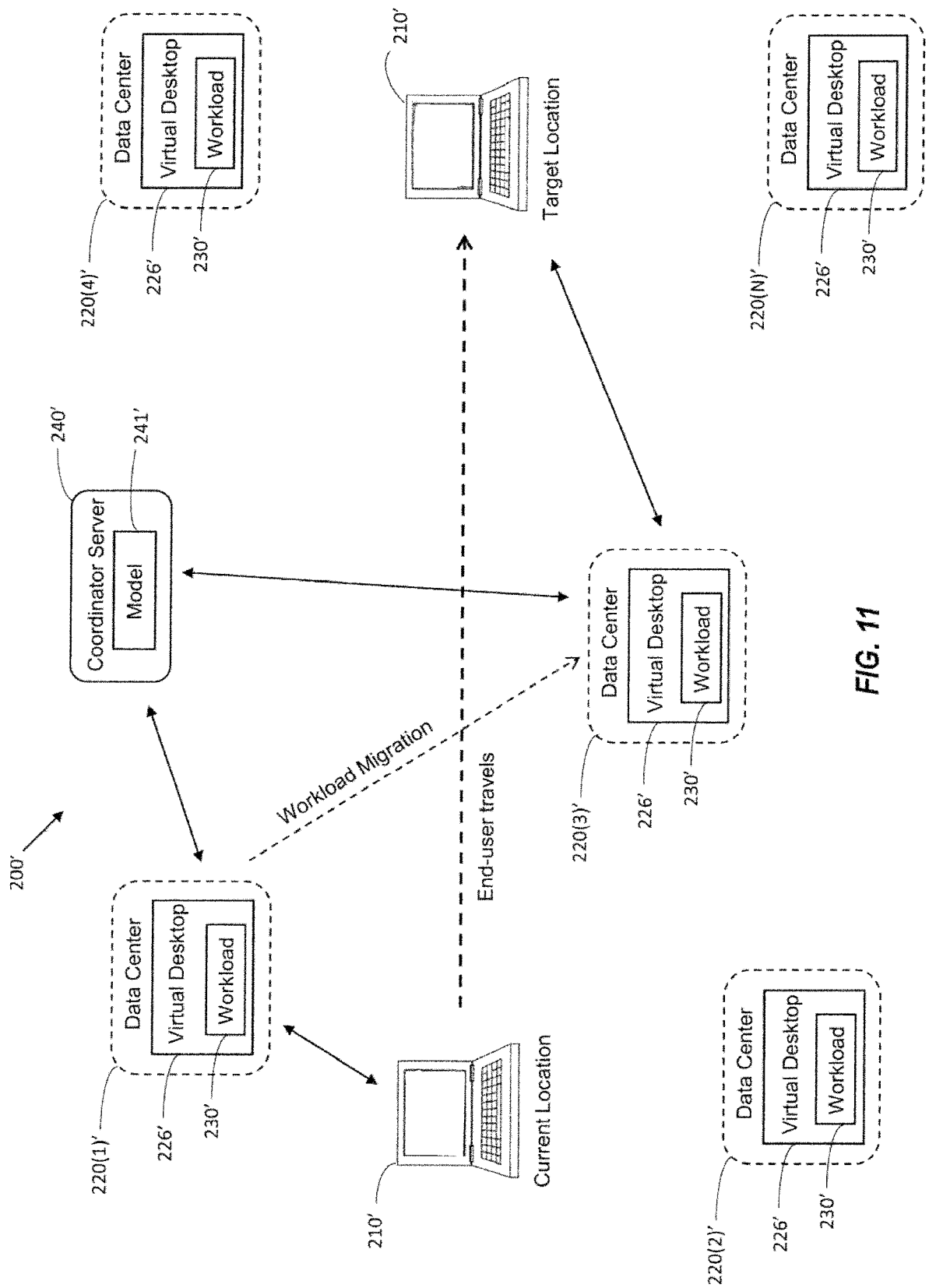
FIG. 11 is a schematic block diagram of another embodiment of the computer system illustrated in FIG. 6 illustrating migration of a desktop workload to a different data center.

Referring now to FIG. 11, a computer system 200' that takes into account factors other than geographic distances between the data centers 220(1) '-220(N)' and a target location of the end-user when reassigning a data center will be discussed. These other factors include, for example, latency, bandwidth, cost to move the workload 230', cost of computing the workload 230', availability of CPU and disk capacity, and/or compliance boundaries.

As discussed above, a client device 210' is configured to remotely access a virtual desktop 226', with the virtual desktop 226' configured to run and store a workload 230' for an end-user of the client device 210'. Geographically distributed data centers 220(1)'-220(N)' provide virtual desktops 226', with one of the data centers 220(1)' being assigned to host the virtual desktop 226' for the client device 210' based on a current location of the end-user.

The coordinator server 240' is configured to determine an indication of a change in location of the end-user, with the change in location to occur at a time in the future. The change in location is from the current location to the target location that is different from the current location. The determined indication may be based on the end-user's calendar, as discussed above. Alternatively, the determined indication may be based on secondary or supplemental information as provided by the workspace app running on the client device 210', as also discussed above.

The coordinator server 240' executes a model 241' to determine which data center from among the plurality of data centers 220(1)'-220(N)' is to be reassigned to host the virtual desktop 226' in response to the determined indication that the end-user will be traveling from the current location to the target location.

After the coordinator server 240' determines that the end-user is to change location, the model 241' is configured to make a number of computations for individual data centers 220'. For example, the model 241' is configured to compute the following for data centers 220': the cost of moving the workload 230', the cost of bandwidth, the latency between the target location of the end-user and the data center 220', and the average bandwidth available between the target location of the end-user and the data center 220'.

Data centers 230' have respective costs associated with hosting the workload 230'. In this case, the costs are referring to respective operational costs of individual data centers 220'. This is different from installation or startup costs to provide the data centers 220'. The cost may be based on available resources within the data center 220', such as CPU availability and disk capacity. When CPU availability and disk capacity is low within a data center 220', then the cost associated with that data center 220' hosting the workload 230' will be at a higher premium. Disk capacity may also affect storage cost, and CPU availability may also affect bandwidth cost.

Similarly, compliance boundaries may also affect cost. Depending on the target location of the end-user, use of certain data centers may be prohibited. For example, the classification of the workload 230' may be such that certain secure communication paths are required between the data center 220' and the client device 210' at the target location. If these secure communication paths are not available, then the data center 220' cannot be used to host the workload 230'.

The coordinator server 240' may receive the necessary information for these computations in real-time from each respective data center 220'. Alternatively, the coordinator server 240' may receive the necessary information from a database. The information in the database is predetermined ahead of time for each of the data centers 220', which is periodically updated so as to provide the most current information to the model 241'. The database may be located within the coordinator server 240' or within a different server that is accessible by the coordinator server 240'. In some cases, the necessary information may be received by the coordinator server 240' from a combination of the data centers 220' and the database.

In addition to the above computations for data centers 220', an administrator or IT personnel provides input on the importance of having a better user experience versus optimizing cost. Prior to the computations being performed by the model 241', the administrator accesses the model 241' and inputs a respective weight for user experience and a respective weight for cost optimization. This input by the administrator may be determined on a case by case basis, or may be a general policy that is applied each time an end-user within an enterprise or organization is to move from a current location to a target location.

Once these weights are provided to the model 241', an optimization function between user experience and cost is defined as follows: MAX(user experience weight×experience improvements; cost weight×cost optimization). Experience improvements correspond to user experience in general among the data centers 220', and cost optimization corresponds to cost in general among the data centers 220'.

A user experience function for a location is a factor of latency and bandwidth. A User Experience Score is determined by the model 241' as follows: f(latency×latency weight, bandwidth×bandwidth weight). When the administrator accesses the model 241' and inputs a respective weight for user experience, this input allows the administrator to further determine the importance of latency versus bandwidth. When a data center 220' is evaluated, the model 241' takes the importance of latency and bandwidth into consideration.

Similarly, a Cost function is computed by the model 241' as follows: COST=f(CPU, Bandwidth, Storage, movement costs). The Cost function takes into account costs for data centers 220' corresponding to CPU availability, bandwidth availability, disk capacity as related to data storage, and cost of moving the workload 230'.

Based on the model 241' as described above, a determination is made on which data center 220' is to be reassigned to host the virtual desktop 226' in response to the determined indication that the end-user is to travel to a target location. The coordinator server 240' then cooperates with the data centers 220(1)'-220(N) to migrate the workload 230' to the reassigned data center 220(3)' in response to travel of the end-user to the target location.

In some cases, the model 241' may determine that a data center 220' should not be reassigned when the end-user is to travel from the current location to the target location. This would be the case when the criteria used to select the reassigned data center as weighted by the administrator are best met by the currently assigned data center 220'.

As illustrated in FIG. 11, data center 220(3)' is selected as the reassigned data center by the model 241' even though data centers 220(4)' and 220(N)' were geographically closer to the target location of the end-user. In this case, for example, the administrator placed a greater weight on user experience with latency being a primary factor for the end-user.

As an alternative to the above-described model 241', the model 241' may be streamlined to focus on particular concerns. For example, these concerns may be to select a data center 220' having a lowest latency, to select a data center 220' having a highest bandwidth, or to select a data center 220' having a lowest cost.

For the lowest latency, the coordinator server 240' determines respective latencies between the target location and individual data centers 220', and selects the data center 220' having the lowest latency. For the highest bandwidth, the coordinator server 240' determines respective bandwidths between the target location and data centers 220', and selects the data center 220' having the highest bandwidth. For the lowest cost, the coordinator server 240' determines respective costs in moving the workload 230' to data centers 220', and selects the data center 220' having the lowest cost.

If the parameters of the above described model 241' are not available, then the data center 220' that is geographically closer to the target location of the end-user will be selected by the coordinator server 240', as described above. In this case, the coordinator server 240' determines the reassigned data center based on determining respective geographic distances between the target location and data centers 220', and selects the data center 220' having a shortest geographic distance.

Figure 12:
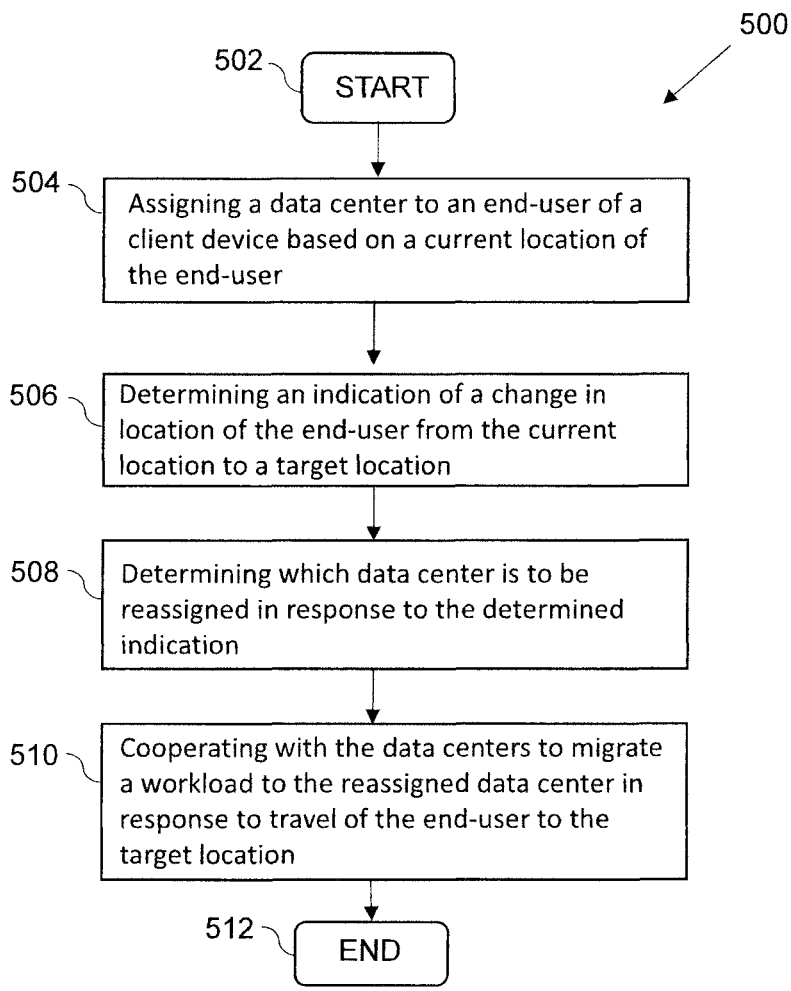
FIG. 12 is a flowchart illustrating a method for operating the coordinator server illustrated in FIG. 6.

Referring now to FIG. 12, a general flowchart 500 illustrating a method for operating the coordinator server 240' as described above will be discussed. From the start (Block 502), the method includes assigning a data center 220(1)' from among a plurality of geographically distributed data centers 220(1)'-220(N)' to host a virtual desktop 226' for a client device 220' based on a current location of the end-user at Block 504. The virtual desktop 226' is configured to run and store a workload 230' for an end-user of the client device 210'. An indication of a change in location of the end-user as discussed above is determined at Block 506. The change in location is to occur at a time in the future, and is from the current location to a target location that is different from the current location.

A determination is made at Block 508 on which data center 220' from among the plurality of data centers 220(1)'-220(N)' is to be reassigned to host the virtual desktop 226' in response to the determined indication. This determination is made by an model 241' that takes into one or more factors, such as user experience and costs of moving the workload 230', for example. The method further includes cooperating with the plurality of data centers 220(1)'-220(N)' to migrate the workload 230' to the reassigned data center 220(3)' in response to travel of the end-user to the target location. The method ends at Block 512.

Figure 13:
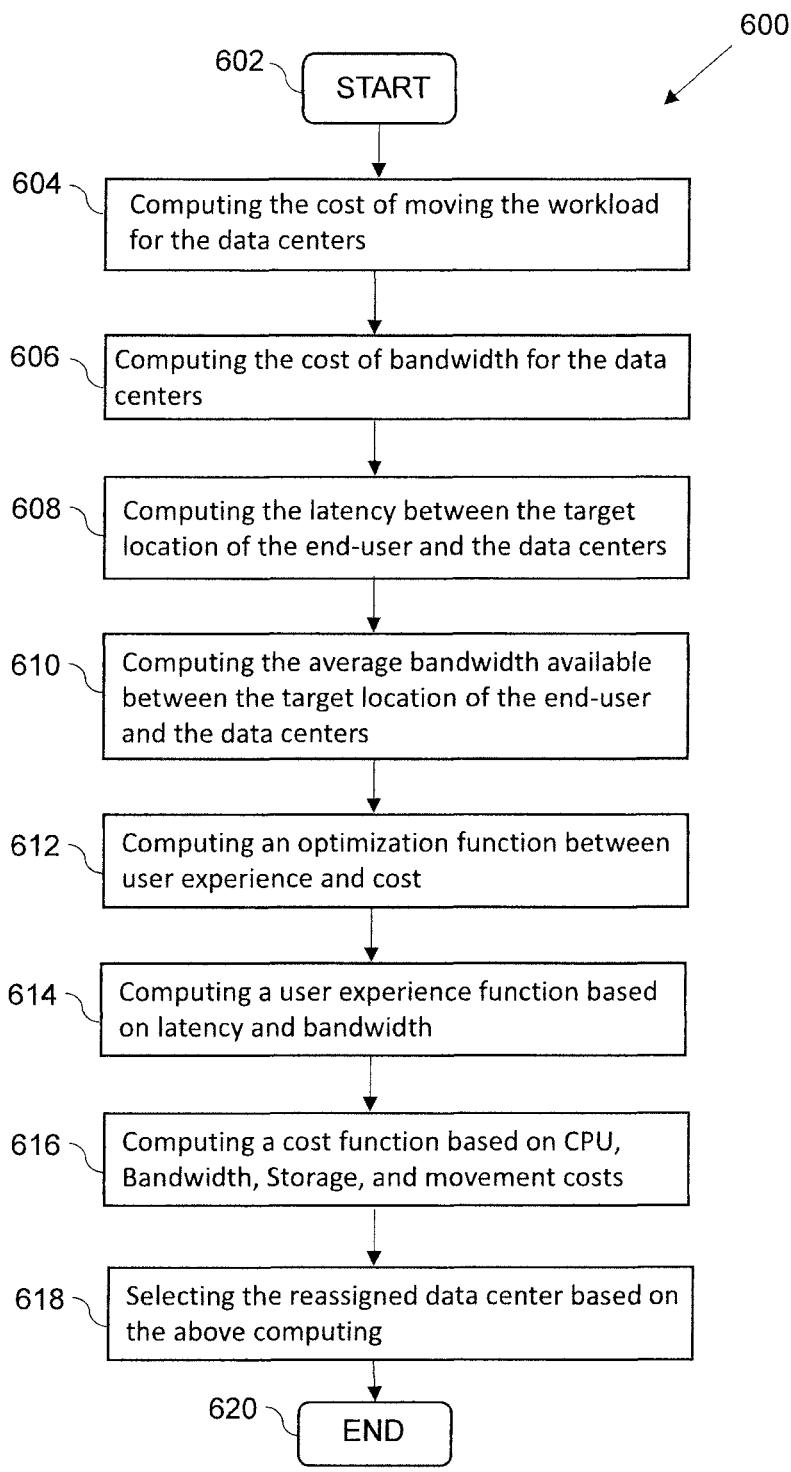
FIG. 13 is a flowchart illustrating a method for determining which data center is to be reassigned after determining the end-user is to travel from a current location to a target location.

Referring now to FIG. 13, a detailed flowchart 600 illustrating determination of which data center 220' is to be reassigned as determined in Block 508 in FIG. 12 will be discussed. From the start (Block 602), the method includes computing the cost of moving the workload 230' for data centers 220' at Block 604, as discussed above. The cost of bandwidth for data centers 220' is computed at Block 606, as discussed above. The latency between the target location of the end-user and data centers 220' is computed at Block 608, as discussed above. The average bandwidth available between the target location of the end-user and data centers 220' is computed at Block 610, as discussed above. An optimization function between user experience and cost is computed at Block 612. A user experience function based on latency and bandwidth is computed at Block 614. A cost function based on CPU, Bandwidth, Storage, and movement costs is computed at Block 616. The method further includes selecting the reassigned data center 220(3)' based on the above computing at Block 618. The method ends at Block 620.

As will be appreciated by one of skill in the art upon reading the above disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed:

1. A computer system comprising:
   a client device comprising first one or more processors, first memory, and first one or more communication interfaces, wherein the client device is configured to remotely access a virtual desktop, with the virtual desktop configured to run and store a workload for an end-user of said client device;
   a plurality of geographically distributed data centers, wherein each of the plurality of geographically distributed data centers comprise one or more servers configured to host a plurality of virtual machines, wherein the plurality of geographically distributed data centers provide a plurality of virtual desktops, with one of the data centers being assigned to host the virtual desktop for said client device based on a current location of the end-user; and
   at least one server comprising second one or more processors, second memory, and second one or more communication interfaces, wherein the at least one server is configured to:
      determine an indication of a change in location of the end user, the change in location occurring at a time in the future and being from the current location to a target location that is different from the current location;
      determine the time in the future when said client device will access the virtual desktop from the target location;
      determine, based on an optimization function, which target data center from among said plurality of data centers is to be reassigned to host the virtual desktop at the target location in response to the determined indication, the optimization function configured to balance a user experience value against a cost of migration value, wherein the user experience value is computed as a weighted function based on latency and bandwidth, and wherein the cost of migration value is computed as a weighted function based on central processing unit (CPU) availability, bandwidth availability, data storage associated with disk capacity, and movement costs associated with migration, and wherein the optimization function maximizes the computed user experience value and the computed cost of migration value, and wherein the optimization function is used to identify the target data center from the plurality of data centers by using the optimization function for at least one or more of the plurality of data centers; and
      if the optimization function indicates the user experience value outweighs the cost of migration value, communicate with said plurality of data centers to migrate the workload to the target data center in response to travel of the end-user to the target location, and prior to the time in the future.

2. The computer system according to claim 1 wherein said server determines the reassigned data center based on the following:
   determine respective geographic distances between the target location and the plurality of data centers; and
   select a data center having a shortest geographic distance.

3. The computer system according to claim 1 wherein said server determines the reassigned data center based on the following:
   determine respective latencies between the target location and the plurality of data centers; and
   select a data center having a lowest latency.

4. The computer system according to claim 1 wherein said server determines the reassigned data center based on the following:
   determine respective bandwidths between the target location and the plurality of data centers; and
   select a data center having a highest bandwidth.

5. The computer system according to claim 1 wherein said server determines the reassigned data center based on the following:
   determine respective costs in moving the workload to the plurality of data center; and
   select a data center having a lowest cost.

6. The computer system according to claim 1 wherein the workload is migrated to the reassigned data center prior to the end-user arriving at the target location.

7. The computer system according to claim 1 wherein the workload includes a calendar for the end-user of said client device; and
   wherein said server determines the indication of the change in location of the end-user based on the end-user's calendar.

8. The computer system according to claim 7 further comprising an exchange server, wherein the exchange server comprises third one or more processors, third memory, and third one or more communication interfaces, and wherein the exchange server is configured to provide the end-user's calendar to said server.

9. The computer system according to claim 7 wherein the end-user's calendar includes upcoming scheduling information on the end-user; and
   wherein said server is further configured to analyze the upcoming scheduling information to determine the indication of the change in location of the end-user to the target location.

10. The computer system according to claim 1 wherein the workload further includes an operating system, at least one application and data.

11. The computer system according to claim 1 wherein the weighted function based on the latency and the bandwidth associated with the user experience value is determined by data defining an Information Technology (IT) administration policy, wherein the IT administration policy is based on balancing importance of user experience versus migration cost.

12. A server comprising:
   a memory and a processor configured to cooperate with said memory to:
      assign a data center from among a plurality of geographically distributed data centers to host a virtual desktop for a client device based on a current location of an end-user of the client device, with the virtual desktop configured to run and store a workload for the end-user of the client device;

determine an indication of a change in location of the end-user, the change in location occurring at a time in the future and being from the current location to a target location that is different from the current location;

determine the time in the future when the client device will access the virtual desktop from the target location;

determine, based on an optimization function, which target data center from among the plurality of data centers is to be reassigned to host the virtual desktop at the target location in response to the determined indication, the optimization function configured to balance a user experience value against a cost of migration value, wherein the user experience value is computed as a weighted function based on latency and bandwidth, and wherein the cost of migration value is computed as a weighted function based on central processing unit (CPU) availability, bandwidth availability, data storage associated with disk capacity, and movement costs associated with migration, and wherein the optimization function maximizes the computed user experience value and the computed cost of migration value, and wherein the optimization function is used to identify the target data center from the plurality of data centers by using the optimization function for at least one or more of the plurality of data centers; and if the optimization function indicates the user experience value outweighs the cost of migration value, communicate with the plurality of data centers to migrate the workload to the reassigned data center in response to travel of the end-user to the target location, and prior to the time in the future.

13. The server according to claim 12 wherein said processor is further configured to determine the reassigned data center based on the following:

determine respective geographic distances between the target location and the plurality of data centers; and select a data center having a shortest geographic distance.

14. The server according to claim 12 wherein the workload is migrated to the reassigned data center prior to the end-user arriving at the target location.

15. The server according to claim 12 wherein the workload includes a calendar for the end-user of the client device; and wherein said processor is further configured to determine the indication of the change in location the end-user based on a calendar of the end-user.

16. The server according to claim 15 wherein the calendar includes upcoming scheduling information on the end-user; and wherein said processor is further configured to analyze the upcoming scheduling information to determine the indication of the change in location of the end-user to the target location.

17. A method comprising:

assigning a data center from among a plurality of geographically distributed data centers to host a virtual desktop for a client device based on a current location of an end-user of the client device, with the virtual desktop configured to run and store workload for the end-user of the client device;

determining an indication of a change in location of the end-user, the change in location to occur at a time in the future and being from the current location to a target location that is different from the current location;

determining the time in the future when the client device will access the virtual desktop from the target location;

determining, based on an optimization function, which target data center from among the plurality of data centers is to be reassigned to host the virtual desktop at the target location in response to the determined indication, the optimization function configured to balance a user experience value against a cost of migration value, wherein the user experience value is computed as a weighted function based on latency and bandwidth, and wherein the cost of migration value is computed as a weighted function based on central processing unit (CPU) availability, bandwidth availability, data storage associated with disk capacity, and movement costs associated with migration, and wherein the optimization function maximizes the computed user experience value and the computed cost of migration value, and wherein the optimization function is used to identify the target data center from the plurality of data centers by using the optimization function for at least one or more of the plurality of data centers; and if the optimization function indicates the user experience value outweighs the cost of migration value, communicate with the plurality of data centers to migrate the workload to the target data center in response to travel of the end-user to the target location, and prior to the time in the future.

18. The method according to claim 17 wherein determining the reassigned data center is based on the following:

determining respective geographic distances between the target location and the plurality of data centers; and selecting a data center having a shortest geographic distance.

19. The method according to claim 17 wherein the workload includes a calendar for the end-user of the client device; and wherein determining the indication of the change in location of the end-user is based on a calendar of the end user.

20. The method according to claim 19 wherein the calendar includes upcoming scheduling information relating to the end-user; and further comprising analyzing the upcoming scheduling information to determine the indication of the change in location of the end-user to the target location.

* * * * *